Aug. 27, 1940.  A. A. STEINMETZ ET AL  2,212,554
VOLTAGE REGULATING SYSTEM
Filed April 17, 1937
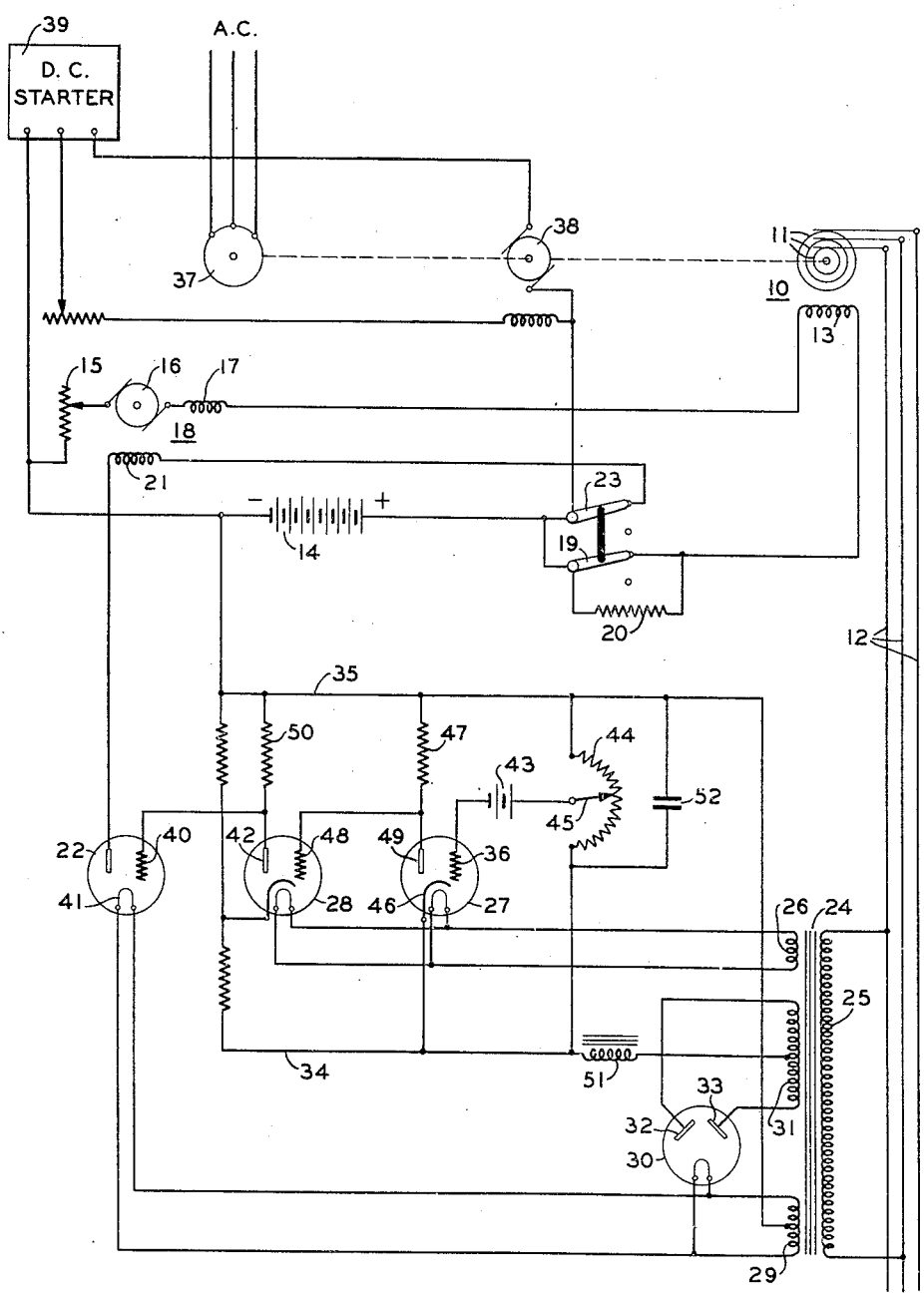
INVENTORS
A. A. STEINMETZ
H. M. WARD
BY Eugene C. Brown
ATTORNEY Patented Aug. 27, 1940

2,212,554

UNITED STATES PATENT OFFICE 2,212,554

VOLTAGE REGULATING SYSTEM

Alfred A. Steinmetz, North Yonkers, and Harley M. Ward, Scarsdale, N. Y., assignors to The Western Union Telegraph Company, New York, N. Y., a corporation of New York Application April 17, 1937, Serial No. 137,578

3 Claims. (Cl. 171—224)

This invention relates to systems for regulating the voltage of dynamoelectric machines in general but has particular application to alternating-current generators. The invention has for its primary object the provision of a regulator which is instantaneously responsive to small voltage changes and which does not employ electromagnetic relays, contacting devices or other relatively slow moving elements.

Heretofore the art has taught the use of electronic regulators in which grid controlled tubes or valves, or rectifiers of the diode type were connected in series with a regulating winding of the machine. A disadvantage of this arrangement is that the valves are capable of conducting only currents of relatively small values making it necessary to use several of these valves suitably arranged, such as in parallel, to conduct a sufficient amount of current to effect the desired regulation.

To obviate this advantage it is another object of the invention to provide a regulator for a dynamoelectric machine in which the regulating effect is produced by utilizing in a novel manner one of the inherent characteristics of a motor, namely, its counterelectromotive force.

It is a further object of this invention to provide electronic means for varying the counterelectromotive force of the motor to produce the regulating effect on an alternating-current generator by employing an electric control valve in series with a control winding of the motor together with means for varying the conductivity of said valve.

A still further object of the invention is the provision of electronic means for detecting and amplifying small changes in the alternating-current voltage to be regulated in order to influence the grid of the electric control valve and thereby vary its conductivity.

For a better understanding of the invention together with other more specific objects thereof, reference is had to the following description taken in connection with the accompanying drawing which shows diagrammatically the circuit arrangement of what is considered at present to be a preferred embodiment of the invention.

Although there is disclosed herein an embodiment of the invention for regulating the output voltage of an alternating-current generator, it is obvious that it also may be employed to regulate other types of current supply. Referring now particularly to the drawing, there is illustrated a generator 10 from the slip rings 11 of which a three phase voltage is supplied to the bus bars 12. The field 13 of the generator 10 is excited from a battery 14, or other suitable direct-current source, the circuit therefor being completed through the rheostat 15, the armature 16 and the series field winding 17 of the motor 18, and either the switch 19 or the resistance 20. The shunt field winding 21 of the motor 18 is also energized from the battery 14 through the electric valve 22 and the switch 23 when closed, as illustrated. A transformer 24 is interconnected between the alternating-current output of the generator 10 and the regulating apparatus, the primary winding 25 of the transformer being connected to two of the bus bars 12. Of the several secondary windings of the transformer 24, winding 26 supplies the energy for heating the cathodes of the tubes 27 and 28, winding 29 supplies the energy for heating the cathodes of the valve 22 and the full wave rectifier 30, and winding 31 furnishes the potential to the anodes 32 and 33 of the rectifier 30. If the load is balanced, that is, divided substantially equally among the three phases of the alternating-current system, it is only necessary that the voltage of one phase be rectified by the tube 30, the direct-current voltage resulting therefrom being applied to the conductors 34 and 35 in a manner such that the former is of negative polarity and the latter positive. The rectified direct-current voltage is used in a novel manner to maintain the desired anode-cathode potential of the tubes 27 and 28 as well as to supply the control voltage to the grid 36 of the tube 27.

The generator 10 is normally driven by the alternating-current motor 37, but in the event of a failure of this motor for any reason, such as an interruption in its power supply, there is also provided a direct-current motor 38 for driving the generator 10. This direct-current motor 38 may be operated from any suitable direct-current source, in this case the battery 14, and is normally disconnected therefrom at the starter 39.

The motor 18 is of the type generally known as a differential motor. That is, it is compound wound with the field produced by its series winding 17 opposed to the field formed by its shunt winding 21. However, the series field 17 is so small in proportion to the shunt field 21 as to be practically negligible when considering the operation of the motor 18 as a part of the improved regulating system herein provided. But the motor 18 is operated with no mechanical load attached thereto and hence, the main purpose of the series field 17 is to oppose the shunt field 21 only to the degree necessary to overcome any magnetism remaining in the latter after its circuit is opened at the switch 23, thereby allowing the machine to come to rest.

The normal exciting current supplied to the alternating-current generator field 13 is adjusted by means of the rheostat 15 and is opposed by the counterelectromotive force generated in the armature 16 of the motor 18. It will be obvious that subsequent control of the exciting current may be effected by varying the magnitude of this counterelectromotive force, and that by suitably adjusting the different elements comprising the excitation circuit, varying degrees of sensitivity of control may be attained as will appear presently.

It is well understood in the art that, with a substantially constant mechanical load, in this case comprising only the windage, friction, etc. of the armature 16, a variation in the strength of the shunt field 21 results in a corresponding change in the generated counterelectromotive force. This variation in the strength of the shunt field 21 is effected by the inclusion, in the circuit supplying energy to the shunt field, of the controlled circuit of the electric valve 22, the conductivity of which is determined by the potential applied to its grid 40 with respect to its cathode 41. The grid 40 of the valve 22 is suitably conditioned by being connected to the output circuit, or anode 42 of the tube 28, of the two-stage amplifier comprising the tubes 27 and 28. The input circuit, or grid 36 of the tube 27, of the amplifier is connected by the biasing battery 43 and potentiometer 44 to the direct-current output circuit of the rectifier 30 by which it is suitably influenced in response to fluctuations in the alternating-current voltage impressed upon the bus bars 12 by the generator 10. The resistance element 44 of the potentiometer is connected between the conductors 34 and 35 which are supplied with direct-current by the rectifier 30. The biasing battery 43 is connected with its negative electrode to the grid 36 of the tube 27 and its positive electrode to the arm 45 of the potentiometer 44.

The following brief description indicates the manner of operation of the voltage regulator in accordance with this invention. While the generator 10 is being started, switches 19 and 23 are kept open until after the current supplied to the field 13 has been adjusted by the rheostat 15 to the value that will result in the desired alternating-current voltage being impressed upon the bus bars 12. The open switch 23 prevents the regulating apparatus from functioning during the starting period, and the open switch 19 includes the resistance 20 in the exciting circuit for the purpose of limiting the current to approximately the same extent as will the counterelectromotive force generated by the motor 18 when it is placed in operation. Assume for the purposes of this description that, when the switches 19 and 23 are closed, the regulating apparatus is adjusted so that there is no appreciable change in the value of the exciting current supplied to the field winding 13 of the generator 10. Then the alternating-current voltage of the bus bars 12 remains constant and the entire system is in a state of equilibrium.

For normal operating conditions the arm 45 of the potentiometer 44 is adjusted so that it connects with a point sufficiently positive to practically overcome the effect of the negative biasing battery 43 and maintain the bias of the grid 36 sufficiently low to allow the tube 27 to conduct a current of substantial value.

Now assume that, for some reason such as an increase in the amount of energy being furnished by the bus bars 12, the alternating-current voltage decreases slightly causing a corresponding decrease in the rectified direct-current voltage impressed upon the conductors 34 and 35. The arm 45 of the potentiometer 44, and consequently the grid 36 of the tube 27, become less positive than before with respect to the cathode 46 resulting in the decreased conductivity of the amplifier tube 27. With less current being conducted through the tube 27 the voltage drop across the resistance 47 is decreased so that now the potential of the grid 48 of the tube 28, which is connected directly to the anode 49 of the tube 27, is more positive than formerly. Conversely to the above, this condition results in an increase in the conductivity of the amplifier tube 28, an increase in the voltage drop across the resistance 50 and a less positive potential of the anode 42 of the tube 28 and the grid 40 of the tube 22. Consequently, the conductivity of the tube 22 is decreased allowing less current to flow through the shunt field winding 21 of the motor 18. As described above, a decrease in the strength of the shunt field of the motor 18 is attended by a decrease in the counter electromotive force generated in the armature 16 resulting in a small increase in the exciting current supplied to the winding 13 of the generator 10. The decrease in the counterelectromotive force must be compensated for by a corresponding increase in the voltage drop across the resistance external of the armature 16. But with the weakened field 21, the exciting current necessary to produce this voltage drop is not sufficient to provide the torque necessary to maintain the speed of the motor 18. Consequently, a reduction in speed is effected which still further decreases the counterelectromotive force causing, in turn, a further increase in the exciting current. This cycle of events continues until a state of equilibrium is attained. By the use of elements of suitable values and with the proper adjustments thereof, the attainment of the stable condition of the motor 18 is practically instantaneous, and the restoration to normal of the alternating-current voltage is simultaneous therewith. The choke coil 51 and the condenser 52 cooperate, in a manner that is well known in the art, as a partial filter for the direct-current portion of the system. Conversely to the above, an increase in the alternating-current voltage will cause a response by the regulating apparatus such that a decrease will be effected sufficient to restore this voltage again to normal.

Hence it is seen that not only does the use of the motor 18 provide a means of regulating currents of substantial values under the control of currents of relatively smaller values, but it also serves, by virtue of its novel connections, to magnify the effects of these smaller currents and thereby increase the sensitivity of the system.

While the primary function of the motor 18 is as stated immediately hereinbefore, it will be appreciated that it may act also in a compensatory capacity. For example, assume that, for supplying the normal exciting current to the alternating-current generator field 13, the battery 14 has a value of 100 volts and the value of the counterelectromotive force generated by the motor 18 is 50 volts. The effective voltage is then 50 volts. Also assume that given variation in the shunt field 21 is attended substantially by a corresponding variation in the counterelectromotive force generated in the armature 16. Under these conditions, then, if the alternating-current voltage decreases from its normal value, a decrease will be effected in the strength of the shunt field 21, and consequently in the counterelectromotive force. From the voltage values chosen, it is apparent that a decrease in the counterelectromotive force will result in a corresponding increase in the effective voltage and also in the exciting current, since the resistance of the exciting circuit is constant. A corresponding increase in the strength of the field 13 will also result, thereby increasing the alternating-current voltage by substantially the amount that it decreased.

However, because of numerous reasons well known in the art, such as the shape of the magnetization curve of the iron, leakage flux, etc., the strength of the field 13 may not vary in exact proportion to the exciting current, so that if the latter be increased by a given amount, the attendant increase in the former may be somewhat less and the increase in the alternating-current voltage resulting therefrom accordingly will be less. An exciting circuit in accordance with this invention provides a means of compensating for this condition by so proportioning the voltage values of the battery 14 and the counterelectromotive force of the motor 18 that a decrease in the counterelectromotive force will result in an increase in the exciting current sufficient to produce a net increase of the desired amount in the alternating-current voltage. For example, with a voltage value of the battery 14 of 150 volts and that of the normal counterelectromotive force of 100 volts, the effective voltage is, as before, 50 volts. But now it is obvious that a variation in the value of counterelectromative force may produce a much greater variation in the effective voltage than in the previous instance, and, as a result thereof, a greater variation in the exciting current.

The foregoing illustration is merely used as an example and it is not to be inferred therefrom that the voltage regulating system herein disclosed is unwieldy or critical in its adjustments. On the contrary, all adjustments are made by the manipulation of the rheostat 15, to govern the value of the normal exciting current as described hereinbefore, and the potentiometer 44, to vary the magnitude of the regulating action through a substantially wide range.

From the foregoing description it is seen that there is provided by this invention a voltage regulator which may be made responsive to small voltage fluctuations by employing a sensitive grid controlled electric valve as a means responsive to said fluctuations. At the same time it is possible, with the relatively small currents which an electric valve is capable of conducting, to vary the counterelectromotive force of a motor sufficiently to control the relatively greater exciting current of an alternator. By providing a voltage regulator in which the inertia of relatively slow moving parts is not involved in effecting the regulation, it is possible to obtain a practically instantaneous response to voltage fluctuations so that the alternating-current voltage can be maintained substantially constant at its normal value through a wide range of load variation. It is also apparent that it is advantageous from the standpoint of economy to supply direct-current energy from one source to both the input and output circuits of the tube amplifier which is a part of the voltage regulator in accordance with this invention.

Obviously, the invention may be reduced to practice in any of a number of different embodiments without departing essentially from the spirit thereof. Hence, it is not limited to the specific form which has been disclosed in these specifications. Likewise, there are many other uses for a voltage regulator such as disclosed herein which will occur to anyone skilled in the art, such as, for instance, a direct-current generator. Also where it is desired to regulate the voltage of a polyphase alternating-current system wherein there exists unbalanced load conditions, it is merely necessary to employ a polyphase rectifier in place of the single phase device disclosed above.

Having described an arrangement and the operation of a novel combination of instrumentalities illustrative of the essential attributes of this invention, the invention is defined by the following claims.

What is claimed is:

1. In a system for regulating the voltage of an electric generator having an exciting circuit including a source of energy and a field winding of said generator, a free running electric motor having its armature connected in said exciting circuit, means including the impedance of said generator field winding for effecting substantial variations of the rate of rotation of said armature in response to and corresponding in sense to changes of the field strength of said motor, and means responsive to any deviation of the output voltage of said generator from a predetermined value to produce a relatively small change in the field strength of said motor, the combined effect of the variation of the field strength and the attendant variation of the armature speed of said motor producing a variation of the counter-electromotive force generated disproportionate to the variation of field strength.

2. In a system for regulating the voltage of an electric generator having a field winding and an exciting circuit therefor including a source of energy, the armature of a free running electric motor in circuit with and constituting a source of variable regulating potential opposed to said source of energy, said armature being susceptible of a wide range of speed changes increasing with a strengthening of the field of said motor and vice versa, and an electronic device responsive to any deviation of the output voltage of said generator from a predetermined value to correspondingly vary the field strength of said motor, said motor thus constituting a high gain amplifier whereby relatively large variations of the regulating potential are produced by relatively small variations of the field strength of said motor.

3. In a system for regulating the voltage of an electric generator having an exciting circuit including a source of energy, a multistage amplifier for magnifying deviations of the output voltage of said generator from a predetermined value, the first of said amplifying stages having a relatively low gain and including a plurality of electronic devices, the final stage of said amplifier having a relatively high gain and including a free running electric motor, and means including circuits connecting the armature of said motor in said exciting circuit and connecting the field of said motor to the output circuit of one of said electronic devices for producing variations of the current in said exciting circuit opposite in sense to said deviations of the generator output voltage.

ALFRED A. STEINMETZ.
HARLEY M. WARD.